Sept. 4, 1956     D. C. PRINCE     2,761,615
VARIABLE CAPACITY COMPRESSOR
Filed Aug. 12, 1952
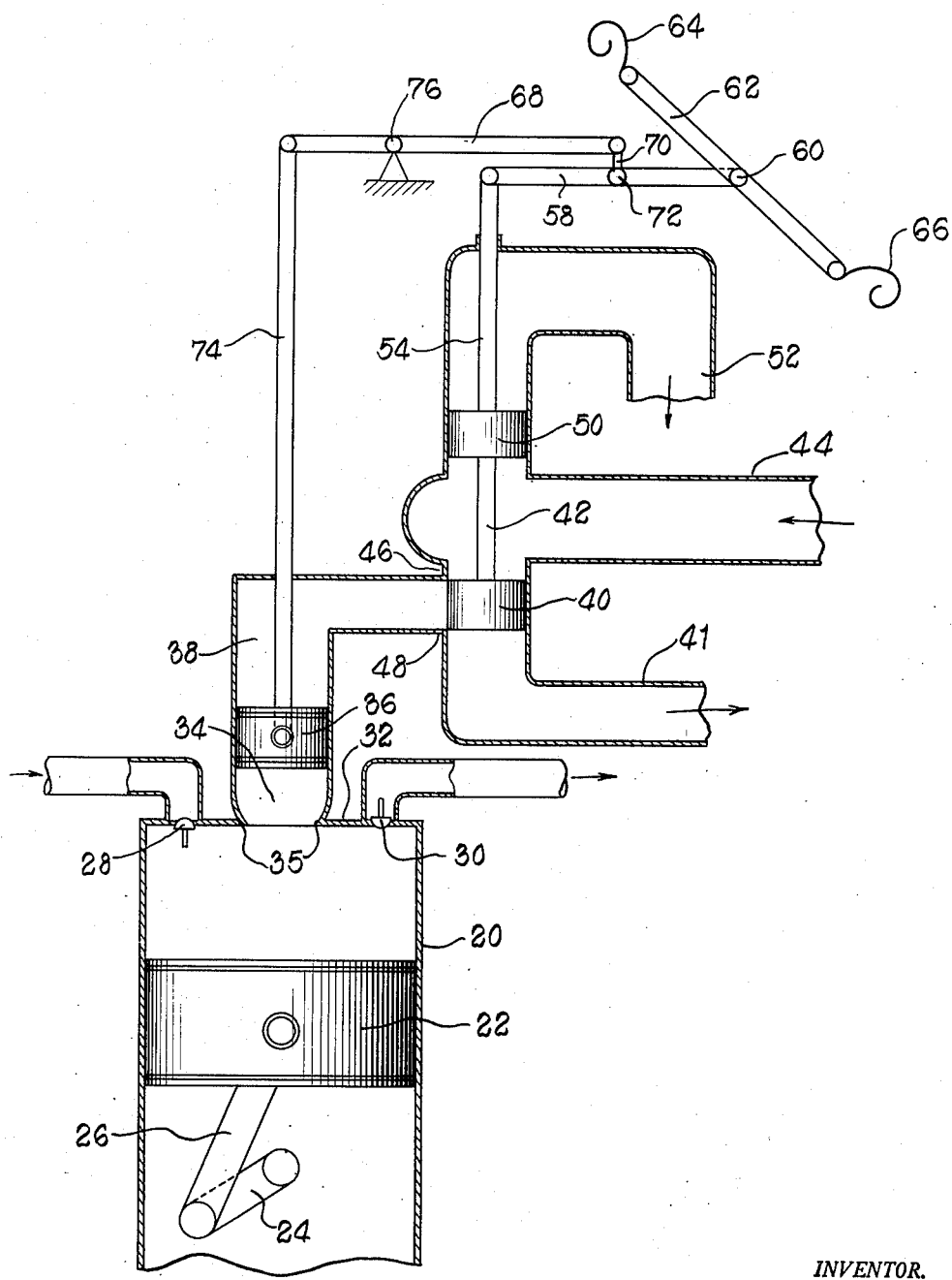
INVENTOR.
DAVID C. PRINCE
BY Davis, Hoxie Faithfull
ATTORNEYS

United States Patent Office 2,761,615
Patented Sept. 4, 1956

2,761,615

VARIABLE CAPACITY COMPRESSOR

David C. Prince, Schenectady, N. Y.

Application August 12, 1952, Serial No. 304,040

3 Claims. (Cl. 230—21)

This invention relates to compressors and more particularly to compressors having a variable capacity.

In the last two decades the utilization of reverse refrigeration of the heat pump cycle for heating buildings such as homes and offices has attracted considerable attention. Various sources have been used to supply the heat required for such systems, for example, the ambient air, water from a lake, river or a well, or the heat from the earth itself. In those systems where the ambient air is used as a heat source, when the outside temperature is low a maximum of work is required of the compressor at the very time when the density of the refrigerating medium is lowest and the resulting load upon the compressor is at a minimum. Conversely when the outside temperature is high, a minimum of work is required of the system when the density of the refrigerating medium is greatest. As under both maximum and minimum operating conditions, the load on the compressor and the quantity of heat produced vary inversely of those in an ideal system, it will be apparent that a constant volumetric capacity compressor is inherently unable to meet the requirements for an efficient and satisfactory performance in a heat pump system.

It is therefore a principal object of this invention to provide a compressor which has a selectively variable volumetric capacity, which is more flexible and efficient under varying load conditions than a conventional compressor, which eliminates re-circulation and feedback losses, which has a constant stroke, which can be readily adapted to changes in capacity in accordance with variations of one or more selected temperatures, which is simple and economical to manufacture, which can be readily adapted to existing heat pump systems, and which advances the art generally.

A compressor in accordance with my invention comprises one or more cylinders having respective main pistons reciprocatingly disposed therein. Connected with the portion of each cylinder above the corresponding piston is a plenum chamber whose effective volume is variable thereby to change the output of the compressor. The volume of the chamber is made variable, for example, by means of an auxiliary piston which is slidingly disposed therein, the chamber preferably being a co-axially disposed extension of the main piston cylinder. The auxiliary piston is moved independently of the main piston, for example by introducing a fluid such as oil under pressure behind the piston. The amount of oil supplied is regulated by a control valve which when the compressor is used in conjunction with a heat pump system is preferably operated by one or more thermostatic elements through a suitable mechanical linkage which is also interconnected with the auxiliary piston to provide a follow up.

These and other objects and aspects will be apparent from the following description of a preferred embodiment of the invention which refers to a drawing wherein the single figure is a schematic diagram of a compressor and its control system.

The single piston compressor illustrated comprises a cylinder 20 wherein is slidably disposed a main piston 22 which is driven by a prime mover (not shown) in the usual manner by means of a crank shaft 24 and a piston rod 26. Inlet and outlet valves 28 and 30 which are of any of the well known conventional designs are shown located in a cylinder head 32 closing the end of the cylinder 20 so that as the crank shaft 24 is rotated, the downstroke of the piston 22 opens the inlet valve 28 to draw the fluid from the compressor inlet line into the clearance space between the top of the piston 22 and the cylinder head 32. Upon the subsequent upstroke of the piston 22, the inlet valve 28 is closed and the fluid pressure builds up in the clearance space opening the outlet valve 30 to force the fluid into the compressor discharge line in the usual manner.

It is to be understood that with the exception of the cylinder head 32 the above described elements of the compressor are conventional in design and form no part of the present invention. The cylinder head 32 is modified by providing a plenum chamber 34 which is interconnected with the clearance space above the piston 22 preferably opening directly thereinto to form an extension of the main cylinder 20. It will be apparent that as the effective volume of the plenum chamber 34 is increased, the compression ratio is decreased so that the capacity of the compressor is correspondingly decreased. Conversely, with the effective volume of the plenum chamber reduced, the compression ratio is greater and the compressor capacity is correspondingly increased. To obtain variations in the compression ratio, the effective volume of the plenum chamber 34 is varied by an auxiliary piston 36 which is slidably disposed in the chamber 34, the piston being prevented from leaving the plenum chamber by the inwardly turned lip 35 which acts as a stop to limit the downward travel of the piston.

Although the position of the piston 36 can be controlled mechanically, I prefer to accomplish such control hydraulically by introducing a fluid under pressure, from a supply such as oil from the compressor lubricating system, behind the piston as in the space 38. The flow of oil to and from the space behind the auxiliary piston 36 is regulated by the lower land 40 of a control valve 42, oil passing from the supply conduit 44 and thence by the upper valve seat 46 as the valve is lowered, and conversely discharging past the lower valve seat 48 to a drain conduit 41 as the valve is raised. To reduce the operating force required to move the control valve 42, the pressure exerted against the lower land 40 is balanced by an upper land 50, leakage by the upper land 50 being carried away by a drain conduit 52.

When the compressor is used as an element of a heat pump or a refrigeration system, it is convenient to control the output of the compressor in accordance with variations of one or more selected temperatures, for example, inside and outside temperatures. To this end the stem 54 of the control valve 42 is pivotally connected as at 56 to one end of a walking beam 58. The opposite end 60 of the beam 58 is similarly connected to a point intermediate the ends of a second walking beam 62 to whose ends are connected respectively two thermostatic elements 64 and 66 which, for example, may be bimetallic strips, vapor pressure operated or other similar devices that will cause the corresponding ends of the walking beam 62 to move upwardly in response to a decrease in temperature. A mechanical follow up is provided by means of a lever 68 one of whose ends is connected by means of a short link 70 to a point 72 intermediate the ends of the first walking beam 58. The opposite end of the lever 68 is connected by means of a link 74 to the auxiliary piston 36. The fulcrum of the lever 68 is at the intermediate point 76.

When the compressor is used in a heat pump system, such as is used to heat a building, its inlet line is connected to receive fluid from the coils of an evaporator (not shown as it forms no part of the present invention) which coils are exposed to the outside air, and the compressor discharge line is connected to the coils of a condenser (not shown) which are exposed to air in the enclosed space being heated. The heat sensitive portion of the thermostatic element 66 is positioned so as to be in contact with the outside air surrounding the evaporator coils, and the heat sensitive portion of the thermostatic element 64 is positioned to be in contact with the inside air surrounding the condenser coils so that a drop in the temperature of either the inside or outside air (or both) causes one (or both) of the ends of the second walking beam 62 to rise. This upward movement causes the first walking beam 58 to pivot about the point 72 so that the beam acts as a simple lever depressing the end 56 of the attached control lever 42. As described heretofore, the lowering of the valve 42 permits oil under pressure to flow in behind the auxiliary piston 36 thus lowering the piston in the plenum chamber 34. The resulting decrease in the effective volume of the plenum chamber 34 increases the flow of fluid through the compressor. By proper proportioning of the size of the plenum chamber and the lever ratio it is possible by such increase in flow to compensate for the decrease in temperature and density of the fluid.

The downward movement of the auxiliary piston 36 also provides a mechanical follow up for the control valve 42 by raising the end of the lever 68 connected to the link 70. The intermediate point 72 of the beam 58 is conjointly raised, and as the end 60 of the beam is relatively fixed for any stable temperature condition, the beam acts as a lever to raise the control valve 42 thus shutting off the supply of oil to the space 38 behind the auxiliary piston 36.

Conversely, when due to a rise in either the indoor or outdoor temperature (or both) less flow of refrigerating fluid is required from the compressor, the thermostatic elements 64 and 66 move the corresponding ends of the second walking beam 62 downwardly so that the control valve 42 is raised permitting oil from behind the auxiliary piston 36 to escape out the discharge conduit 49. The effective clearance space above the main piston 22 is thus made greater to increase the fluid flow through the compressor thus compensating for the rise in temperature and density of the fluid.

I claim:

1. A fluid compressor having a variable capacity, comprising a cylinder, a piston reciprocable in the cylinder, a plenum chamber communicating with the cylinder at the working end of the piston, an auxiliary piston forming at one end a movable wall of the plenum chamber, the auxiliary piston being slidable in the chamber to vary the effective volume thereof and thus the capacity of the compressor, a control chamber at the opposite end of the auxiliary piston, a source of liquid under pressure and a liquid discharge line, both independent of the chambers at opposite ends of the auxiliary piston, a control valve for alternately connecting the control chamber to said source and discharge line to position the auxiliary piston so as to determine the volumetric capacity of the compressor, a thermostat, a linkage connecting the thermostat to the valve for operating the valve in response to temperature changes, and a follow-up connection between the linkage and the auxiliary piston.

2. A fluid compressor having a variable capacity, comprising a cylinder, a piston reciprocable in the cylinder, a plenum chamber communicating with the cylinder at the working end of the piston, an auxiliary piston forming at one end a movable wall of the plenum chamber, the auxiliary piston being slidable in the chamber to vary the effective volume thereof and thus the capacity of the compressor, a control chamber at the opposite end of the auxiliary piston, a control valve for introducing a liquid under pressure into the control chamber selectively to position the auxiliary piston so as to determine the volumetric capacity of the compressor, a linkage including a thermostat for operating the valve in response to temperature changes, and a follow-up connection between the linkage and the auxiliary piston, the linkage including a first walking beam one end of which is connected to said control valve, said thermostat having operating means connected to move the opposite end of the beam in response to changes in temperature, and a lever one end of which is interconnected with a point on said beam intermediate the ends thereof, the other end of said lever being linked with said auxiliary piston to complete the follow up.

3. A fluid compressor according to claim 2 wherein the thermostatic operated means includes a second walking beam, an intermediate point of which is linked with the end of said first walking beam opposite the end to which is connected said control valve, and two thermostatic elements responsive respectively to different temperature variations, each element being interconnected with a correlated end of said second walking beam so that variation in either temperature will move said control valve.

References Cited in the file of this patent

UNITED STATES PATENTS

| 1,918,882 | Witkiewicz et al. | July 18, 1933 |
| 1,985,642 | Moody | Dec. 25, 1934 |
| 1,997,476 | Wallene | Apr. 9, 1935 |
| 2,004,474 | Schaer | June 11, 1935 |
| 2,570,965 | Meyers | Oct. 9, 1951 |

FOREIGN PATENTS

| 853 | Great Britain | 1897 |
| 257,956 | Switzerland | Oct. 3, 1948 |